United States Patent Office 2,832,788
Patented Apr. 29, 1958

2,832,788

CRYSTALLINE ALKALINE EARTH METAL SALTS OF 4-AMINO-3-ISOXAZOLIDONE

Dale A. Harris and Frank J. Wolf, Westfield, N. J., and Robert L. Peck, deceased, late of Plainfield, N. J., by Helen McLean Peck, administratrix, Plainfield, N. J., assignors to Merck & Co., Inc., Rahway, N. J., a corporation of New Jersey No Drawing. Original application February 4, 1955, Serial No. 486,292. Divided and this application May 13, 1957, Serial No. 665,877

4 Claims. (Cl. 260—307)

This invention relates to new antibiotic agents. More particularly, it is concerned with the preparation of a novel antibiotic substance, D-4-amino-3-isoxazolidone, obtained by means of a new species of streptomyces.

The discovery of the remarkable antibiotic properties of penicillin stimulated great interest in this field and has resulted in the finding of many other valuable antibiotic substances produced by fermentation such as streptothricin, streptomycin, gramicidin, subtilin, bacitracin, aureomycin, terramycin, and the like. In general, such antibiotics are particularly active in inhibiting the growth of certain bacteria but may be entirely inactive against others. Thus, some of these products are active against certain gram-negative bacteria, others are active against gram-positive bacteria, and several are active against both gram-negative and gram-positive bacteria. In general, however, the activity of these known antibiotics is usually limited to a few pathogenic microorganisms and work has been continued in this field in an effort to find other antibiotics which would be effective against a wider range of pathogens.

Although some of these antibiotics have been found to be invaluable in the treatment of various diseases, it is found that certain strains of some pathogenic microorganisms develop a resistance to a particular antibiotic and as a result the antibiotic is no longer active against such microorganisms. Accordingly, the deficiencies of the known antibiotics has stimulated further research to find other antibiotics which will be active against a wider range of pathogens as well as against resistant strains of particular organisms.

It is an object of the present invention to provide a new and useful antibiotic which is highly effective in inhibiting the growth of various pathogenic bacteria, including both gram-negative and gram-positive types. It is a further object to provide solutions of this new antibiotic which have valuable bactericidal properties.

Another object is to provide a process of preparing this novel antibiotic substance by the fermentation of aqueous nutrient mediums with suitable strains of a heretofore unknown microorganism. Other objects will be apparent from the detailed description hereinafter provided.

In accordance with the present invention, it is found that a new and valuable antibiotic substance, the D isomer of 4-amino-3-isoxazolidone, is produced during the fermentation of suitable aqueous mediums by a previously unknown microorganism. This microorganism has been identified as a new species of streptomyces which has been called S. garyphalus.

S. garyphalus is a new but widely occurring microorganism and strains thereof have been isolated from soil samples from both temperate and tropical climates by the usual soil dilution techniques. Thus, dilutions of soils selected from Chicacao, Guatemala, Nahualate Road, Guatemala, and New York State were plated on dextrose-asparagine agar and after a suitable incubation period yielded many actinomycete isolates which were selected and tested for their ability to produce antibiotic substances. Microorganism No. 106–7 from soil from Chicacao, Guatemala; microorganisms Nos. 190–8, 190–9 and 190–33 from soil from the Nahualate Road, Guatemala; and microorganisms Nos. 540–33 and 540–34 from soil from New York State were isolated and found to produce significant antibiotic activity. These microorganisms were found to have essentially identical morphological and physiological characteristics. When each of these microorganisms was cultured in shake flasks and the culture filtrates tested for antibiotic activity by the cup test procedure described in Journal of Bacteriology, volume 50, page 701, 1945, the microbiological spectrums reported in Table 1 were obtained.

TABLE 1

Zone diameter of inhibited growth surrounding the cylinder containing the culture filtrate being tested

| Strain | KP[1] | SD | SS | ET | EC | PA | MP | DP | SF | SP |
|---|---|---|---|---|---|---|---|---|---|---|
| 106–7 | 21 | 25 | 24 | 22 | 26 | 13 | 28 | 28 | 24 | 23 |
| 190–8 | 20 | 24 | 22 | 21 | 25 | 11 | 35 | 25 | 17 | 22 |
| 190–9 | 16 | 24 | 25 | 21 | 26 | 13 | 28 | 27 | ---- | ---- |
| 190–33 | 20 | 26 | 26 | 19 | 27 | + | 30 | 27 | 21 | 24 |
| 540–33 | 15 | 22 | 23 | 20 | 24 | — | 25 | 23 | 17 | 25 |
| 540–34 | 18 | 24 | 23 | 20 | 27 | 11 | 29 | 32 | 22 | 25 |

[1] KP = *Klebsiella pneumoniae*
SD = *Shigella dysenteriae*
SS = *Salmonella schottmülleri*
ET = *Eberthella typhosa*
EC = *Escherichia coli*
PA = *Pseudomonas aeruginosa*
MP = *Micrococcus pyogenes* var. *aureus*
DP = *Diplococcus pneumoniae*
SF = *Streptococcus faecalis*
SP = *Streptococcus pyogenes*

The data summarized in Table 1 indicates that the same antibiotic substance D-4-amino-3-isoxazolidone is produced by fermentation with these microorganism strains.

A study of the strains of microorganisms listed in Table 1 disclosed them to be a species of streptomyces previously unknown and not described in Bergey's Manual of Determinative Bacteriology, Sixth Edition. This new species of microorganism was therefore given the name *Streptomyces garyphalus*. This microorganism is distinguished from other streptomyces by forming straight sporulating hyphae shell pink in color and by its ability to reduce nitrates to nitrites. Other secondary characteristics which are considered definitive in establishing *S. garyphalus* as a new species of streptomyces are its ability to peptonize milk, liquify gelatin and hydrolyze starch.

The cultural characteristics of an individual strain of *S. garyphalus* useful for producing our new substance are summarized in the following table:

TABLE 2

Morphological and cultural characteristics of Streptomyces garyphalus strain No. 106–7, isolated from Guatemala soil Morphology: Straight sporulating hyphae. No spirals observed. Conidia rod-shaped, 0.8–1.1 by 1.7–1.9 microns.

Gelatin: Liquefaction occurring after 6 days' incubation at 28° C. Greyish-white ring and greyish-white submerged pellicle. Dark brown layer of pigment forming at 1 to 2 days. Upon shaking becomes a greenish-brown color.

Starch agar: Hydrolyzed. Excellent growth. Grey edged with white aerial mycelium. Reverse cream-colored. Faint brown soluble pigment.

Glucose-asparagine agar: Good colorless growth. White aerial mycellium. Reverse white. No soluble pigment.

Modified glucose-asparagine agar: Excellent powdery pinkish-white growth. Sea-shell pink aerial mycelium. Reverse buff. No soluble pigment.

Nutrient broth: Greyish-white pellicle and ring. No soluble pigment.

Nutrient agar: Good colorless growth. Greyish-white aerial mycelium. Also subsurface growth. Reverse cream-colored. Faint brown soluble pigment.

Litmus milk: Slowly petonized. Milk at first dark purple and later a brownish purple. pH 6.4. Faint greyish-white ring. Tan sediment in bottom of tube.

Nitrate agar: Nitrites strongly produce from nitrates.

Indole medium: Indole not produced.

Czapek's sucrose solution: No growth.

Czapek's sucrose agar: Fair colorless growth. Greyish-white aerial mycelium. Reverse colorless. No subsurface growth. No soluble pigment. Culture produced hemolysis on brain heart infusion blood agar.

Potato wedge: Heavy, wrinkled growth. Aerial mycelium very dark greyish-black. Potato darkened.

Ca malate agar: Colorless growth. No aerial mycelium.

Cellulose: not decomposed.

Glucose broth: Greyish-white ring. Submerged greyish-white pellicle. Faint tan pigment. At two weeks faintly acid.

Yeast extract-dextrose agar: Excellent growth. Aerial mycelium, greyish-white becoming pinkish-grey and finally sea-shell pink. Faint brown soluble pigment.

Starch-tryptone agar: Good growth. Gray aerial mycelium. Dark brown soluble pigment.

Peptone-glucose agar: Cream-colored growth. Aerial mycelium greyish-white becoming pink. Faint brown soluble pigment.

Optimum temperature: Grows well at 24, 26, 28, and 37° C. No growth at 47° C.

Optimum pH: 7.0–7.2

Aerobic

The description of the particular strain given above is intended to be illustrative of suitable strains of S. garyphalus which can be employed in the practice of this invention, but it is to be understood that this invention is not to be limited to the use of any particular strain having the characteristics defined above. This invention also contemplates the use of other strains of S. garyphalus producing D-4-amino-3-isoxazolidone such as those obtained by natural selection as disclosed in Table 1, or those produced by artificial mutation, for example, by X-ray irradiation, ultra-violet irradiation, and the like.

D-4-amino-3-isoxazolidone is produced during the aerobic fermentation of suitable aqueous mediums, under conditions described hereinafter, by strains of Streptomyces garyphalus. Aqueous mediums such as those employed for the production of other antibiotics may be suitable for the production of our new product. Such mediums contain sources of carbon and nitrogen assimilable by the microorganism and inorganic salts. In addition, the fermentation mediums contain traces of metals necessary for the growth of the organism. These trace elements are usually supplied in the form of impurities present in the constituents of the medium.

In general, carbohydrates such as sugars, for example, dextrose, sucrose, maltose, lactose, dextrin, and the like, and starches are suitable sources of assimilable carbon in the nutrient mediums. The extract quantity of the carbon source which is utilized in the medium will depend in part on the other ingredients of the medium, but it is usually found that an amount of carbohydrate between about 1 and 3% by weight of the medium is satisfactory. These carbon sources can be used either individually, or several such carbon sources may be combined in the medium.

Various nitrogen sources such as casein hydrolysates, papaic digests of soybean meal, soybean meal, peanut meal, peanut oil meal, distillers' solubles, corn steep liquor, sodium nitrate, ammonium chloride, ammonium sulfate, and the like, are readily assimilated by Streptomyces garyphalus and can be used in the fermentation mediums for the production of the new antibiotic. In general, we find that organic sources of nitrogen, particularly soybean meal and distillers' solubles, are very satisfactory for the production of D-4-amino-3-isoxazolidone. The various organic or inorganic sources of nitrogen can be used either alone or in combination, in amounts ranging from about 0.2 to 5% weight of the aqueous medium.

We have also found that the addition of sodium chloride to a medium containing suitable sources of assimilable carbon and nitrogen in an amount ranging from about .1 to 1% is desirable for the production of the new antibiotic. In general, we find that an amount of sodium chloride equivalent to about ¼% by weight of the nutrient medium is most satisfactory.

The fermentation, using a D-4-amino-isoxazolidone producing strain, can be carried out at temperatures ranging from about 24°–37° C. For optimum results, we find it most convenient to conduct these fermentations at temperatures of about 28° C.

The pH of the nutrient mediums suitable for growing Streptomyces garyphalus and producing the antibiotic can vary from about 6 to 7. Usually, as will be shown hereinafter, the fermentation mediums preferably employed have a pH within this range and can be utilized without any further adjustment of the pH.

Although our new antibiotic is produced both by surface growth and submerged growth of the organism, it is presently preferred to carry out the fermentation in the submerged state. Small scale fermentations are conveniently carried out by placing suitable quantities of nutrient mediums in Erlenmeyer flasks, sterilizing the flasks and contents by heating at 120° C., inoculating the flask with either spores or a vegetative cellular growth of a D-4-amino-3-isoxazolidone producing strain of S. garyphalus, loosely stoppering the necks of the flasks with cotton, and permitting the fermentation to proceed in constant temperature rooms at about 28° C. on a suitable shaker for about 2–4 days.

For larger scale work, it is preferable to conduct the fermentation in suitable tanks provided with an agitator and a means of aerating the fermentation medium. In this method, the nutrient medium is made up in the tank and sterilized by heating at 120° C. After cooling, the sterilized medium is inoculated with a suitable source of vegetative cellular growth of the antibiotic producing strain of S. garyphalus and the fermentation is permitted to proceed for 2–4 days while aerating and/or agitating the nutrient medium and maintaining the temperature at about 28° C. This method of producing D-4-amino-3-isoxazolidone is particularly suited for the preparation of large quantities of this new antibiotic.

In accordance with a preferred embodiment of our invention, we have found that an aqueous nutrient medium containing about 3% soybean meal, 2% dextrose, 0.75% distillers' solubles and 0.25% sodium chloride is particularly useful in producing our new antibiotic by submerged cultivation with a suitable strain of S. garyphalus. Maximum production of the antibiotic in such a medium usually occurs after incubation at about 28° C. for about 65 hours.

Our new antibiotic may be conveniently recovered from the fermentation broth by a number of methods. One such method comprises filtering the broth and drying the filtrate to produce a solid having the antibiotic incorporated therein. A similar solid of enhanced purity and greater activity may be obtained by first treating the filtered broth with charcoal, filtering the mixture, concentrating the filtrate under reduced pressure, and spray-drying the concentrate under reduced ressure. In this manner, a solid containing D-4-amino-3-isoxazolidone is obtained having an activity of about 4 to 12 streptomycin units per milligram as determined by the cup-plate diffusion assay method using *Micrococcus pyogenes* var. *aureus* and a streptomycin standard.

The examples which follow are presented as illustrative of fermentation methods useful in the preparation of our new antibiotic.

EXAMPLE 1

50 ml. of a medium containing 3% soybean meal, 2% dextrose, 0.75% distillers' solubles and 0.25% NaCl in distilled water was placed in 250 ml. Erlenmeyer flasks. The flasks were inoculated with 2 ml. of a vegetative growth of *Streptomyces garyphalus* and incubated at 28° C. on a rotary shaking machine of 2½" amplitude at 220 R. P. M. for 4 days. The mycelium was removed by filtration and the resulting broth tested for antibacterial activity against bacteria by the cup assay procedlure. The diameter of the zone of inhibition around the assay cylinder of the various test cultures is shown in the following table:

| Test culture | Zones of inhibition in mm. |
|---|---|
| K. pneumoniae | 17 |
| S. dysenteriae shiga | 22 |
| Salmonella schottmülleri | 22 |
| Salmonella typhosa | 21 |
| Escherichia coli W | 24 |
| Pseudomonas aeruginosa | 14 |
| M. pyogenes var. aureus Smith | ±26 |
| Diplococcus pneumoniae | 26 |
| Dillon strain, resistant to streptomycin | 19 |
| M. pyogenes var. aureus, resistant to streptothricin | Active |

EXAMPLE 2

3.2 liters of an aqueous medium containing 3% soybean meal, 2% dextrose, 0.75% distillers' solubles and 0.25% NaCl was placed in a 5 liter fermentor. The medium was sterilized at 120° C. for 1½ hours and, after cooling, inoculated with 200 ml. of a vegetative growth of *Streptomyces garyphalus*. The medium was fermented at 28.5° C. for 96 hours with aeration and agitation. The activity of the filtered broth (2.57 l.) was determined on the basis of a cup assay using *M. pyogenes* var. *aureus* and a streptomycin standard. This broth had an activity of 100 streptomycin units per ml. using *M. pyogenes* var. *aureus* (approx. 5 units/mg.).

EXAMPLE 3

An aqueous fermentation medium was prepared having the following composition:

| | Percent |
|---|---|
| Sucrose | 2.5 |
| Peanut oil meal or peanut meal | 1.5 |
| $CaCO_3$ | 0.4 |
| Corn steep liquor | 0.2 |
| $(NH_4)_2SO_4$ | 0.2 |
| NaCl | 0.2 |

50 ml. portions of this medium were placed in 250 ml. Erlenmeyer flasks, sterilized, and inoculated with 2 ml. of a vegetative growth of *Streptomyces garyphalus*. The flasks were incubated at 28° C. on a rotary shaking machine of 2½" amplitude at 220 R. P. M. for 4 days. The activity of the filtered broth was determined by the cup-plate diffusion method using *M. pyogenes* var. *aureus* and a 65 u./mg. D-4-amino-3-isoxazolidone preparation as standard. This broth had an activity of 120 streptomycin units per ml.

EXAMPLE 4

An aqueous fermentation medium was prepared having the following composition:

| | Percent |
|---|---|
| Papaic digest of soybean meal | 1 |
| Dextrose | 1 |

This medium was inoculated and incubated as described in Example 3.

The broth had an activity of 100 streptomycin units per ml.

D-4-amino-3-isoxazolidone concentrates of greater activity can be obtained following the methods disclosed in the copending application of Rudolf P. Buhs, Edwin J. Newstead, and Nelson R. Trenner, Serial No. 298,844, filed July 14, 1952, now abandoned. This method comprises acidifying the filtered fermented broth containing the D-4-amino-3-isoxazolidone to a pH of about 2 and thereafter adsorbing the antibiotic on a strongly acid cation-exchange resin on the alkaline cycle. The resin adsorbate is then washed with water to remove weakly adsorbed or non-adsorbed contaminants. The active product is recovered by eluting the resin adsorbate with an aqueous solution of a suitable organic or inorganic base and freeze-drying the eluate. In this manner, D-4-amino-3-isoxazolidone concentrates having activities of about 50 to 200 units per milligram are obtained.

The strongly acid cation-exchange resin containing nuclear sulfonic acid groups or methylene sulfonic groups are particularly useful as adsorbing agents in this process. Trade names of commercially available resins of this type that might be mentioned are Amberlite IR 120, a sulfonic acid cation exchanger (produced by Rohm and Haas Co.), Dowex 50, a polystyrene-divinylbenzene cross link sulfonic acid cation exchanger (produced by Dow Chemical Co.), and Duolite C-10, a porous sulfonated coal cation exchanger (produced by Chemical Process Co.). These resins are readily placed on the alkaline cycle for use in adsorbing D-4-amino-3-isoxazolidone by reacting the resin with a suitable alkali metal or alkaline earth metal hydroxide and then washing the resin to remove excess alkali. The strongly acid cation-exchange resins on the sodium cycle have been found to be particularly useful for this purpose.

The application of this process for the recovery and purification of D-4-amino-3-isoxazolidone from a fermented broth can be carried out as follows:

The pH of 100 ml. of the filtered broth prepared as described in Example 2 was adjusted to 1.5 by adding 4 ml. of 2.5 N HCl. The broth was passed through a column containing approximately 6 grams of Amberlite IR 120 sulfonic acid type resin on the sodium cycle at the rate of 25 ml. per hour.

The antibiotic remained on the column and was washed with 50 ml. of water. Elution of the activity was carried out with 0.1 N $NH_4OH$. When 45 ml. of effluent had passed through the column, the pH rose from 5 to 6 and activity was found in the eluate. Essentially all of the activity was eluted between pH 6 and 10 in about 20 ml. of effluent. Lyophilized solids from the individual cuts in this pH region had activities ranging from 50 units/mg. to 122 units/mg. (The activities were determined by the cup-plate diffusion method using *M. pyogenes* var. *aureus* and a streptomycin standard.)

The D-4-amino-3-isoxazolidone concentrates having a potency of about 50 to 200 units per milligram produced in accordance with this method can be further purified to obtain the antibiotic in pure form.

One such process, which is, however, not a part of the present invention, being the invention of Irving Putter, Serial No. 379,280, filed September 9, 1953, now abandoned, comprises adsorbing the antibiotic from the eluates of the cation-exchange resin adsorbates described above onto a strongly basic anion-exchange resin on the hydroxyl cycle, removing contaminating impurities from the resulting resin adsorbate with water, and eluting the desired product with an anion containing eluent. The resins which are useful in this process are the strongly basic quaternary ammonium type of anion exchange resins deriving their capacity from quaternary amine groups present in the polymer such as those described in U. S. Patents 2,597,494, 2,597,440, 2,570,822, 2,567,836, and 2,543,666.

Trade names of specific resins useful in this process that might be mentioned are Amberlite IRA 400, Amberlite IRA 410, Amberlite XE-98, Amberlite XE-75, Amberlite XE-58 (produced by Rohm & Haas Co.), Ionac A-293 (produced by American Cyanamid Corp.), and Dowex 2 (produced by Dow Chemical Co.). These resins are readily converted to the hydroxyl cycle for use in this process by contacting the resins with an alkaline solution, such as sodium hydroxide, and washing the treated resin with water to remove the excess alkali. After adsorbing the antibiotic on the anion-exchange resin on the hydroxyl cycle, the resulting adsorbate is eluted with an anion containing eluent, for example, an aqueous solution of strong base, such as sodium hydroxide, potassium hydroxide and the like, an aqueous solution of an acid such as hydrochloric acid, sulfuric acid, acetic acid, and the like, or an aqueous solution of a salt such as sodium chloride, potassium chloride, sodium sulfate, and the like. When the elution is carried out with an acidic solution, the fractions of eluate having a pH within the range of about 7 to 4.5 contain the desired antibiotic. When basic eluting agents are used, the eluate fractions having a pH of about 7 to 14 are found to contain the D-4-amino-3-isoxazolidone. Upon freeze-drying the resulting eluates the antibiotic having an activity of about 250–300 units per milligram can be obtained. The following example illustrates this method of purifying D-4-amino-3-isoxazolidone:

A 3000 ml. fraction of D-4-amino-3-isoxazolidone containing eluate having a pH of 8.5 and assaying 1400 u./ml. which was obtained by eluting the cation-exchange adsorbate (Amberlite IR 120) with ammonium hydroxide as described above, was passed through a column containing 250 ml. of an anion exchange resin (Amberlite IRA-400) on the hydroxyl cycle, at the rate of about 25 ml./min. The effluent assayed 0 u./ml. The column was then washed with 250 ml. of water and the antibiotic eluted by washing the resin adsorbate with about 2500 ml. of a 2% aqueous solution of acetic acid. The eluate fraction having a pH ranging from about 7 to 4.5 amounted to about 1065 ml. and assayed 3211 u./ml.

D-4-amino-3-isoxazolidone, having an activity of about 250–300 units per milligram can be obtained by merely freeze-drying the eluates so obtained. If desired these eluates can be further treated to obtain D-4-amino-3-isoxazolidone in crystalline form.

One such process, which is, however, not a part of the present invention, being the invention of Eugene E. Howe, Serial No. 386,391, filed October 15, 1953, now abandoned, comprises adjusting the pH of the eluate obtained from the foregoing described anion-exchange resin process to about 8.5, evaporating the alkaline eluate to a small volume, adding a mixture of lower aliphatic alcohols to the resulting concentrate, adjusting the pH of the alcoholic solution to about 6, and cooling the solution thereby causing the D-4-amino-3-isoxazolidone to precipitate in crystalline form. This method of obtaining crystalline D-4-amino-3-isoxazolidone can be illustrated by the following specific example:

The eluate amounting to 1065 ml. and assaying 3211 u./ml. obtained by the elution of the anion-exchange (Amberlite IR 120) adsorbate with a 2% aqueous solution of acetic acid described above, was adjusted to a pH of about 8.5 by the addition of sodium hydroxide. The resulting alkaline eluate was concentrated to about 100 ml., and the concentrate diluted with 500 ml. of isopropanol and 500 ml. of ethanol. This alcoholic solution was then filtered to remove some insoluble material. Upon adjusting the pH of the filtrate to about 5.8 with acetic acid and cooling, crystalline D-4-amino-3-isoxazolidone was precipitated. The crystalline product recovered by filtration had a potency of 305 u./mg.

Crystalline D-4-amino-3-isoxazolidone is an essentially colorless material which is very soluble in water and essentially insoluble in anhydrous alcohols, acetone, chloroform, ethyl acetate and pyridine. It decomposes in glacial acetic acid.

The natural pH of crystalline D-4-amino-3-isoxazolidone in water is about 6 and it has an optical rotation of about $[\alpha]_D^{23} = +116°$ in water. It is amphoteric in nature and when titrated with acid gives a pK of about 4.5 and an equavalent weight of about 101 and when titrated with alkali gives a pK of 7.4 and an equivalent weight of approximately 103. The molecular weight of D-4-amino-3-isoxazolidone is about 100 as determined by freezing point depression methods.

The composition of a purified sample of crystalline D-4-amino-3-isoxazolidone was determined by chemical analysis to be approximately 35.85% carbon, 5.67% hydrogen, 27.9% nitrogen and the difference oxygen.

D-4-amino-3-isoxazolidone can be represented by the structural formula

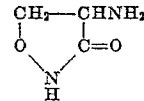

D-4-amino-3-isoxazolidone has no melting point in the usual sense but decomposes over the range from about 150 to 155° C.

Also highly characteristic of this antibiotic is its ultraviolet absorption curve which has a maxima at 2260 A. (E% =403) in water at pH 6.

When D-4-amino-3-isoxazolidone is crystallized from aqueous solution it is obtained as a crystalline monohydrate. The anhydrous antibiotic is readily produced either by heating the monohydrate under reduced pressure until the water is removed or by crystallizing the antibiotic from an essentially anhydrous solvent.

The X-ray diffraction patterns of the crystalline monohydrate and the crystalline anhydrous product indicate that these substances occur in different crystalline forms as determined by dissimilar intensities of reflection summarized in Table 3 following.

TABLE 3

*Anhydrous D-4-amino-3-isoxazolidone*

| Line | Interplanar distance in A. | Relative reflection intensity in percent |
| --- | --- | --- |
| 1 | 9.11 | 15 |
| 2 | 4.73 | (100) |
| 3 | 4.56 | 55 |
| 4 | 4.27 | 85 |
| 5 | 4.02 | 40 |
| 6 | 3.79 | 25 |
| 7 | 3.46 | 20 |
| 8 | 3.04 | 35 |
| 9 | 2.83 | 40 |
| 10 | 2.71 | 45 |

*D-4-amino-3-isoxazolidone monohydrate*

| Line | Interplanar distance in A. | Relative reflection intensity in percent |
| --- | --- | --- |
| 1 | 5.21 | 30 |
| 2 | 4.00 | 15 |
| 3 | 3.91 | 20 |
| 4 | 3.77 | (100) |
| 5 | 3.66 | 20 |
| 6 | 3.24 | 40 |
| 7 | 3.13 | 40 |
| 8 | 2.80 | 15 |

The infrared absorption spectra of the anhydrous base and the base monohydrate crystalline forms were determined by mulling the crystals in liquid petrolatum and observing the infrared absorption band positions with a Baird infrared spectrophotometer fitted with sodium chloride optics. The results obtained are summarized in Table 4.

TABLE 4

*Principal infrared absorption bands—wave length in microns*

| Anhydrous D-4-amino-3-isoxazolidone | D-4-amino-3-isoxazolidone monohydrate |
|---|---|
| 2.8–4.4 multiple bands | 3.0. |
| 4.65 | 3.2–3.3. |
| 6.12 | 3.6–4.6 multiple bands. |
| 6.20 shoulder | 5.0 shoulder. |
| 6.30 | 5.93. |
| 6.42 | 6.1 shoulder. |
| 6.52 | 6.17 shoulder. |
| 7.10 | 6.23 shoulder. |
| 7.3 | 6.37. |
| 7.5 | 6.50 shoulder. |
| 7.85 | 7.04. |
| 8.15 | 7.30. |
| 8.55 shoulder | 7.52. |
| 8.80 | 7.72. |
| 9.40 | |
| 10.68 | 8.15. |
| 10.9 | 8.60. |
| 11.2–11.3 shoulder | 8.69. |
| 11.38 | 9.19. |
| 12.08 | 10.0. |
| 13.25 | 10.37 shoulder. |
| 15.0 | 10.42. |
| | 11.25. |
| | 12.27. |
| | 13.5 broad band. |

Also characteristic of D-4-amino-3-isoxazolidone is its $R_f$ value which is defined as the ratio of the distance traveled by a spot of the antibiotic from its starting point on a paper chromatogram to the distance traveled by a developing solvent. In experiments with D-4-amino-3-isoxazolidone using 4:1, ethanol:water and 4:2:1, butanol:water, acetic acid systems as developing solvents $R_f$ values of 0.33 to 0.37 were obtained. In these experiments the spots D-4-amino-3-isoxazolidone were readily located by using a solution of 0.2% ninhydrin in 95% ethanol which gives a characteristic yellow-blue color in contact with the antibiotic.

Since D-4-amino-3-isoxazolidone is an amphoteric substance, it forms both metal salts such as alkali and alkaline earth metal salts, and acid addition salts such as the hydrochloride, sulfate and the like. These salts can be prepared in accordance with conventional procedures known in the art.

Alkali metal and alkaline earth metal salts of D-4-amino-3-isoxazolidone are readily provided by contacting the antibiotic with a suitable alkali metal or alkaline earth metal base in water. For this purpose, the alkali and alkaline earth metal oxides, hydroxides, carbonates and bicarbonates have been found satisfactory. Isolation of the alkaline earth metal salts such as the calcium, barium, and magnesium salts in crystalline form is achieved by precipitating the salt from aqueous solutions by the addition of ethanol or isopropanol. The alkali metal salts of D-4-amino-3-isoxazolidone may be conveniently recovered by evaporating the aqueous solutions of such salts to dryness.

Thus, the calcium, magnesium and barium salts of D-4-amino-3-isoxazolidone are prepared as follows:

Three grams of calcium oxide was slurried in 40 ml. of water and cooled to 0–5° C. Five grams of D-4-amino-3-isoxazolidone having a potency of 260 u./mg. was added to the slurry and the mixture filtered. The filter cake was washed with 10 ml. of water and the wash combined with the filtrate. The filtrate was at pH 11.0–11.5 and enough additional crystalline D-4-amino-3-isoxazolidone was added until the pH reached 9.5. Charcoal was added and the solution stirred for 15 minutes and filtered. Six volumes of ethanol was added to the filtrate to precipitate the calcium salt of D-4-amino-3-isoxazolidone in crystalline form. The crystals were collected, washed with ethanol and dried under reduced pressure. The calcium salt had a potency of 190–220 u./mg. It decomposed at 215–221° C., had a titration equivalent weight of 151–154 and its ultraviolet absorption curve exhibited a maxima at 2240 A. (E%=262). The optical rotation was $[\alpha]_{25}^D = +74°$. The water of crystallization was about 21% or 3.5 moles of water per mole of calcium salt.

Similarly, the magnesium salt of D-4-amino-3-isoxazolidone was produced by reacting 3 g. of magnesium hydroxide with 5 g. of D-4-amino-3-isoxazolidone having a potency of 260 u./mg. according to the above procedure. The magnesium salt had a potency of 200–220 u./mg. and decomposed at 224–228° C. The optical rotation was $[\alpha]_{25}^D = +78°$ and its ultraviolet absorption curve exhibited a maxima at 2240 A. (E%=274). The water of crystallization was found to be about 20% or 3 moles of water per mole of magnesium salt.

The barium salt of D-4-amino-3-isoxazolidone is prepared by adding one gram of the antibiotic having a potency of 260 u./mg. slowly with agitation to 10 ml. of water containing 1.5 g. of $Ba(OH)_2 \cdot 8H_2O$. The solution was filtered and the residue washed with 1 ml. of water. To the clear filtrate was added 40 ml. of 95% ethanol and 40 ml. of isopropanol and the solution centrifuged to separate a small oil phase. The solvent layer was chilled to 0° C. and stirred for one hour. The barium salt of D-4-amino-3-isoxazolidone precipitated from solution in crystalline form and was collected, washed with isopropanol and then ether. It had a potency of 180 u./mg. and decomposed at 205–215° C.

Acid addition salts of D-4-amino-3-isoxazolidone such as the hydrochloride, sulfate, and the like can be prepared by adding the appropriate acid to an aqueous solution of the antibiotic base. The salts may be recovered from the aqueous solution by the addition of a miscible solvent in which the acid salt is insoluble.

Thus, the sulfate addition salt of D-4-amino-3-isoxazolidone is prepared by the following method:

A 10% aqueous solution of crystalline D-4-amino-3-isoxazolidone having an activity of 260 u./mg. was acidified with sulfuric acid to pH 2.5 at room temperature. Ten volumes of isopropanol were added to the solution and crystals of D-4-amino-3-isoxazolidone sulfate precipitated immediately. It was then dried under reduced pressure at room temperature. The product had an activity of 185 u./mg.

Titration of D-4-amino-3-isoxazolidone sulfate with alkali gave a pK of about 4.5 and an equivalent weight of 175 and a pK of 7.4 and an equivalent weight of 167. Karl Fischer assay disclosed 8.3% water present. The product therefore probably has the formula (D-4-amino-3-isoxazolidone)$_2 \cdot H_2SO_4 \cdot 2H_2O$.

D-4-amino-3-isoxazolidone is a wide spectrum antibiotic which has pronounced activity against a large number of both gram-positive and gram-negative bacteria. Examples of some of the gram-positive bacteria against which it is active are *Streptococcus pyogenes, M. pyogenes* var. *aureus, Streptococcus faecalis, Diplococcus pneumoniae, Erysipelothrix rhuspiopathiae, Corynebacterium diphtheriae, C. ovis, C. renalis, C. diphtheriae* and *C. xerosis.* Examples of some gram-negative bacteria against which it is also active are *Escherichia coli, Klebsiella pneumoniae, Salmonella schottmülleri, Shigella dysenteriae, Salmonella typhosa* and *Pseudomonas aeruginosa.*

TABLE 5

*Comparative antibacterial spectrum of D-4-amino-3-isoxazolidone, streptomycin and oxytetracycline in vitro by cup diffusion method*

| Organism | Zones of inhibition, diameters in mm. | | | | |
|---|---|---|---|---|---|
| | D-4-amino-3-isoxazolidone [1] | | | SM,* 0.1 mg./cc. | TM,* 0.1 mg./cc. |
| | 5 mg./cc. | 0.5 mg./cc. | 0.05 mg./cc. | | |
| Klebsiella pneumoniae | 25 | **+ | **− | 15 | 20 |
| Shigella dysenteriae (Shiga) | 34 | 21 | − | 13 | 25 |
| Salmonella schöttmülleri | 33 | 20 | − | 15 | 23 |
| Salmonella typhosa | 29 | 17 | − | 17 | 23 |
| Escherichia coli | 36 | 24 | 11 | 16 | 21 |
| Pseudomonas aeruginosa | 25 | − | − | 10 | 14 |
| E. coli (Dillon strain) | 30 | 16 | − | − | 22 |
| M. Pyogenes var. aureus | 38 | 24 | + | 19 | 27 |
| M. Pyogenes var. aureus (streptothricin resistant) | 40 | 40 | 36 | − | 31 |
| Streptococcus faecalis | 32 | 16 | − | + | 27 |
| Streptococcus pyogenes | 32 | 18 | − | + | 30 |
| Diplococcus pneumoniae | [2] 35 | [3] 14 | [4] − | + | 38 |

*SM=crystalline streptomycin calcium chloride complex.
*TM=crystalline oxytetracycline hydrochloride.
**+=inhibition under cup only (8 mm.)  −=no inhibition.
[1] D-4-amino-3-isoxazolidone having an activity of 150 u/mg. used.
[2], [3], [4] D-4-amino-3-isoxazolidone having an activity of 60 u/mg. used.
[2] D-4-amino-3-isoxazolidone concentration, 2 mg./cc.
[3] D-4-amino-3-isoxazolidone concentration, 0.2 mg./cc.
[4] D-4-amino-3-isoxazolidone concentration, 0.02 mg./cc.

TABLE 6

*Differential effect of D-4-amino-3-isoxazolidone, oxytetracycline and streptomycin on sensitive and resistant strains of M. pyogenes var. aureus*

| Antibiotic | Concentration of D-4-amino-3-isoxazolidone, mg./cc. | Zones of inhibition,* diameters in mm. (representative results) | | |
|---|---|---|---|---|
| | | Normal strain | Streptomycin resistant strain | Terramycin resistant strain |
| (*) | 3.1 | 33 | 31 | 36 |
| (*) | 0.31 | 19 | 15 | 22 |
| (*) | 0.031 | − | − | + |
| Oxytetracycline | 1.0 | NT | NT | + |
| Oxytetracycline | 0.1 | 27 | NT | − |
| Streptomycin | 2.0 | NT | − | NT |
| Streptomycin | 0.1 | 19 | − | NT |

*D-4-amino-3-isoxazolidone.
+=Inhibition under cup (8 mm.)
−=No inhibition.
NT=Not tested.
[1] Antibiotic (D-4-amino-3-isoxazolidone) having an activity of 92 u./mg used.

TABLE 7

*Differential effect of antibiotic 106–7, streptomycin, chlortetracycline, oxytetracycline, chloromycetin, and streptothricin on sensitive and resistant strains of M. pyogenes var. aureus*

| Antibiotic | M. pyogenes | M. pyogenes OMR | Dillion | M. pyogenes | M. pyogenes STSMR | M. pyogenes | M. pyogenes TMR | M. pyogenes AMR |
|---|---|---|---|---|---|---|---|---|
| 106–7 Batch 2930 | 18.0 | >35 | | | | | | |
| 106–7 Batch 3969 | 20.0 | >35 | | | | | | |
| 106–7 Batch 3971 | 21.0 | >35 | | | | | | |
| Chloromycetin: | | | | | | | | |
| 0.25 mg./ml | 17.0 | 0 | | | | | | |
| 0.10 mg./ml | 20.0 | 0 | | | | | | |
| 106–7 Batch 4179 | | | 19 | 28 | >35 | | | |
| 106–7 Batch 3969 | | | 15 | 25 | >35 | | | |
| 106–7 Batch 3971 | | | 20 | 28 | 31 | | | |
| Streptomycin calcium chloride complex, 100 u./ml | | | − | 22 | − | | | |
| Streptothricin hydrochloride, 1,000 u./ml | | | | | − | | | |
| Streptothricin hydrochloride | | | | | | | | |
| Chlortetracycline hydrochloride, γ/ml.: | | | | | | | | |
| 5 | | | | | | 14 | <10 | <10 |
| 10 | | | | | | 15.5 | <10 | <10 |
| 25 | | | | | | 23 | 13 | 13 |
| 50 | | | | | | 21.5 | 14 | 15 |
| 75 | | | | | | 23.5 | 17 | 16 |
| 100 | | | | | | 24 | 18 | 20 |
| Oxytetracycline hydrochloride, γ/ml.: | | | | | | | | |
| 5 | | | | | | 13 | <10 | <10 |
| 10 | | | | | | 16 | <10 | <10 |
| 25 | | | | | | 20 | 10 | 12 |
| 50 | | | | | | 22 | 12 | |
| 75 | | | | | | 23 | 14 | |
| 100 | | | | | | 24 | 16 | |
| 106–7 Batch 4179 | | | | | | 20 | 18 | 18 |

SMR—streptomycin-resistant; AMR—chlortetracycline-resistant; TMR—oxytetracycline-resistant; OMR—chloromycetin-resistant; STR—streptothricin-resistant.

It is seen from the results of Table 5 that D-4-amino-3-isoxazolidone is obviously different from streptomycin which primarily inhibits only gram-negative bacteria. The new antibiotic resembles oxytetracycline somewhat in having inhibitory effect on both gram-negative and gram-positive bacteria. However, it is relatively more potent than oxytetracycline against a streptothricin resistant strain of M. pyogenes var. aureus.

Tables 6 and 7 summarize the results of cross-resistance studies made with a normally sensitive strain of M. pyogenes var. aureus and sub-cultures from this strain which have become resistant to oxytetracycline, chlortetracycline, chloromycetin, streptothricin, and streptomycin.

The results in Tables 6 and 7 indicate that the new antibiotic is distinctly different from streptothricin, chlortetracycline, chloromycetin, streptomycin and oxytetracycline. These experiments indicate that the resistant strains of M. pyogenes var. aureus respond like a normally sensitive strain when exposed to D-4-amino-3-isoxazolidone. These data further justify the conclusion that D-4-amino-3-isoxazolidone is different than oxytetracycline.

Other experiments in vitro have indicated that D-4-amino-3-isoxazolidone has significant inhibitory effect on the growth of M. tuberculosis (virulent, human strain). The growth of this pathogen has been completely inhibited by D-4-amino-3-isoxazolidone base in concentration of 0.005–0.01 mg./cc. of Dubos' medium.

Tests with mice show that D-4-amino-3-isoxazolidone concentrates have a curative effect for several in vivo bacterial infections. The results of one such in vivo experiment with two gram-positive bacteria and two-gram negative bacteria are shown in Table 8.

TABLE 8

*Effect of D-4-amino-3-isoxazolidone concentrates on representative gram-positive and gram-negative bacterial infections in mice*

| Infecting organism | Activity of D-4-amino-3-isoxazolidone concentrate, Streptomycin, units/mg. | Minimal effective doses (mg./20 gm.) | | Therapeutic index, (LD 50/ ED 50) |
|---|---|---|---|---|
| | | ED 100 | ED 50 | |
| Subcutaneous treatment: | | | | |
| M. pyogenes var. aureus | 150 | 6.2 | 1.4 | 100 |
| Diplococcus pneumoniae | 60 | >50.0 | 31.0 | 4.2 |
| Klebsiella pneumoniae | 60 | 50.0 | 15.6 | 8.3 |
| Salmonella schottmülleri | 150 | 12.5 | 4.1 | 34.0 |
| Oral treatment: | | | | |
| M. pyogenes var. aureus | 60 | 25.0 | 8.8 | >34 |
| Do | 92 | 3.1 | 1.9 | >158 |

In another in vivo experiment the antibacterial activity of D-4-amino-3-isoxazolidone base (300 u./mg.) and certain of its salts was compared. The results obtained are summarized in Table 9 in terms of the effective dose required to protect 50% of a group of 20 g. mice from death by the disease.

TABLE 9

| Form of D-4-amino-3-isoxazolidone | Infecting organism | ED 50 in mg./20 g. |
|---|---|---|
| | *Single oral dose* | |
| Base | Micrococcus aureus | 0.99 |
| Calcium | do | 0.99 |
| Magnesium | do | 1.05 |
| Sulfate | do | 1.80 |
| Sodium | do | 1.71 |
| Base | Klebsiella pneumoniae | 2.49 |
| Calcium | do | 4.55 |
| Calcium | Salmonella schottmülleri | 7.35 |
| | *Single subcutaneous dose* | |
| Base | M. aureus | 0.69 |
| Sulfate | do | 0.61 |
| Sodium | do | 1.32 |
| Base | K. pneumoniae | 2.51 |

D-4-amino-3-isoxazolidone has antirickettsial activity in vivo for mice and chicken embryos infected with the rickettsiae of murine typhus. When mice infected with rickettsiae are given a single subcutaneous dose of 5 mg. or two doses of 2.5 mg. of D-4-amino-3-isoxazolidone having a potency of 300 streptomycin units per milligram they are completely protected from otherwise lethal infections. The same amount (5 mg.) gives complete protection to chick embryos infected with rickettsiae.

D-4-amino-3-isoxazolidone effectively destroys *Borellia novyi*, the spirochete of relapsing fever, in mice. Single subcutaneous doses administered 24 hours post-infection are just as effective as when given immediately after infection.

Results of acute toxicity tests in mice administered single doses of several D-4-amino-3-isoxazolidone concentrates are summarized in Table 10.

TABLE 10

*Acute toxicity of D-4-amino-3-isoxazolidone in mice*

| Sample | Activity of D-4-amino-3-isoxazolidone concentrate, streptomycin, units per mg. | Acute LD 50 mice, mg./20 g. mouse | | |
|---|---|---|---|---|
| | | Route | | |
| | | Intravenous | Subcutaneous | Oral |
| 1 | 60 | >80 | 130 | >300. |
| 2 | 150 | >63 | Ca. 150 | Not tested. |
| 3 | 92 | Not tested | 162 | >300. |

These data indicate that D-4-amino-3-isoxazolidone is relatively well tolerated. In comparison with crystalline chlortetracycline and oxytetracycline [subcutaneous LD 50=60–80 mg./20 g. and 12–13 mg./20 g. respectively (Schoenbach, Ann. N. Y. Acad. Sci. 53 (2):247)], D-4-amino-3-isoxazolidone is approximately ½ and ⅒ as toxic, respectively.

Further tests conducted with rats and dogs with concentrates of D-4-amino-3-isoxazolidone base having a potency of about 300 u./mg., have shown that this product is well tolerated by the test animals.

After administering concentrates of D-4-amino-3-isoxazolidone to mice in dosages of 25 and 50 mg./20 mg. subcutaneously and 50 mg./20 g. orally, the blood concentrations were assayed using a cup-plate method with *M. pyogenes* var. *aureus* as the test organism. The results obtained are summarized in Table 11.

TABLE 11

| Dosage, mg./20 g. | Activity of D-4-amino-3-isoxazolidone, units/mg. | Route | Antibiotic concentration in serum, mg./cc. (hours post-administration) | | | | | | | |
|---|---|---|---|---|---|---|---|---|---|---|
| | | | ¼ | ½ | ¾ | 1 | 1½ | 2 | 2½ | 3 |
| 25 | 92 | Subcutaneous | 1.35 | 0.65 | 0.6 | 0.58 | 0.17 | 0.03 | 0.05 | 0 |
| 50 | 92 | do | 0.52 | 0.33 | 0.28 | 0.17 | 0.07 | 0 | 0 | 0 |
| 50 | 92 | Oral | 0.7 | 0.53 | 0.34 | 0.22 | 0.06 | 0.04 | 0 | 0 |

D-4-amino-3-isoxazolidone and its acid addition salts or metal salts are useful antimicrobial agents. Thus, they can be utilized to remove susceptible microorganisms from pharmaceutical equipment and the like, or to separate certain microorganisms from solutions containing mixtures of several microorganisms. In addition, they are useful for topical application and aid in restoring healthy tissue. For this purpose, they can be used in solution, or in the form of an ointment and the like prepared in accordance with procedures known in the art.

Further, D-4-amino-3-isoxazolidone and its acid and metal salts are useful growth promoting agents for animals. Thus, swine which were fed an adequate diet supplemented with small amounts of D-4-amino-3-isoxazolidone gained weight more rapidly than those maintained on the unsupplemented diet.

Also, D-4-amino-3-isoxazolidone or its salts are useful in the treatment of animals infected with microorganisms which are susceptible to the action of these products. For example, they are effective in the treatment of bovine mastitis.

The 4-amino-3-isoxazolidone or salts thereof can be used either in the form of pure products or concentrates thereof prepared as described above depending upon the particular purpose for which it is intended. Usually, it is preferred to use the isoxazolidone in the form of a metal salt, since such salts are unusually stable.

The D-4-amino-3-isoxazolidone herein described is also known by the name oxamycin.

In the foregoing description of this invention, the activity of D-4-amino-3-isoxazolidone and its salts, is expressed as streptomycin units. This activity was determined by standard cup-plate diffusion methods using *M. pyogenes* var. *aureus* and a streptomycin standard. The assay method is the same as that used for the assay of streptomycin except that a different test organism is employed.

This application is a continuation-in-part of our copending application Serial No. 365,271, filed June 30, 1953, and a division of our copending application Serial No. 486,292, filed February 4, 1955.

Various changes and modifications in the procedures herein disclosed will occur to those skilled in the art, and to the extent that such changes and modifications are embraced by the appended claims, it is to be understood that they constitute part of our invention.

What is claimed is:

1. Crystalline alkaline earth metal salts of 4-amino-3-isoxazolidone.
2. The crystalline calcium salt of D-4-amino-3-isoxazolidone.
3. The crystalline magnesium salt of D-4-amino-3-isoxazolidone.
4. The crystalline barium salt of D-4-amino-3-isoxazolidone.

No references cited.